United States Patent [19]
Hamilton et al.

[11] Patent Number: 5,623,510
[45] Date of Patent: Apr. 22, 1997

[54] TUNABLE, DIODE SIDE-PUMPED ER: YAG LASER

[75] Inventors: Charles E. Hamilton, Bellevue, Wash.; Laurence H. Furu, Modesto, Calif.

[73] Assignee: The United States of America as represented by the United States Department of Energy, Washington, D.C.

[21] Appl. No.: 436,690

[22] Filed: May 8, 1995

[51] Int. Cl.[6] .......................... H01S 3/091; H01S 3/094
[52] U.S. Cl. .............................. 372/75; 372/20; 372/70
[58] Field of Search .............................. 372/20, 41, 75, 372/93, 70

[56] References Cited

U.S. PATENT DOCUMENTS

| | | | |
|---|---|---|---|
| 5,022,033 | 6/1991 | Hackell | 372/94 |
| 5,276,695 | 1/1994 | Scheps | 372/20 |
| 5,305,345 | 4/1994 | Albrecht et al. | 372/70 |
| 5,497,387 | 3/1996 | Okazaki | 372/70 |

*Primary Examiner*—Rodney B. Bovernick
*Assistant Examiner*—Robert E. Wise
*Attorney, Agent, or Firm*—Henry P. Sartorio; John P. Wooldridge; William R. Moser

[57] ABSTRACT

A discrete-element Er:YAG laser, side pumped by a 220 Watt peak-power InGaAs diode array, generates >500 mWatts at 2.94 μm, and is tunable over a 6 nm range near about 2.936 μm. The oscillator is a plano-concave resonator consisting of a concave high reflector, a flat output coupler, a Er:YAG crystal and a YAG intracavity etalon, which serves as the tuning element. The cavity length is variable from 3 cm to 4 cm. The oscillator uses total internal reflection in the Er:YAG crystal to allow efficient coupling of the diode emission into the resonating modes of the oscillator. With the tuning element removed, the oscillator produces up to 1.3 Watts of average power at 2.94 μm. The duty factor of the laser is 6.5% and the repetition rate is variable up to 1 kHz. This laser is useful for tuning to an atmospheric transmission window at 2.935 μm (air wavelength). The laser is also useful as a spectroscopic tool because it can access several infrared water vapor transitions, as well as transitions in organic compounds. Other uses include medical applications (e.g., for tissue ablation and uses with fiber optic laser scalpels) and as part of industrial effluent monitoring systems.

20 Claims, 2 Drawing Sheets

TUNABLE, DIODE SIDE-PUMPED ER: YAG LASER

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

1. Field of the Invention

The present invention relates to tunable solid state lasers, and more specifically, it relates to a tunable diode side-pumped Er:YAG laser.

2. Description of Related Art

In recent years, interest in the development of tunable solid state lasers has increased significantly. A room temperature, tunable solid state laser that operates in the two-micron range is taught in U.S. Pat. No. 4,969,150, which is directed to an end-pumped, ion-doped, solid state laser for producing a CW emission over the approximate spectral range of 1.86 to 2.14 microns.

Neodymium solid-state lasers (e.g., Nd:YAG) are widely used in a variety of applications. One problem with neodymium lasers is that they have moderate efficiency. Neodymium has a narrow absorption band (about 3 nm). Consequently, the pump diodes must be carefully engineered and cooled to keep them at the same wavelength. Precise temperature control is required, consuming a great deal of power for refrigeration. Moreover, neodymium has a short fluorescence lifetime. For a diode-pumped laser, this dramatically increases the cost of the system, since a large number of expensive diode arrays are required for operation.

A variety of methods have been employed for optically pumping solid-state laser. A common method is to use an arc lamp or other similar light source to excite a laser rod. The light source and rod are positioned within and at different foci of a highly reflective housing of elliptical cross-section. This method typically requires relatively large diameter laser rods to efficiently absorb enough of the pumping light emitted by the light source to allow solid-state laser operation. For some industrial operations such as processing electronic materials, compact diode-pumped solid state lasers offer numerous advantages. There are several different methods for diode-pumping solid state lasers.

Diode-pumped Er:YAG lasers have been low power (200 mWatts), end-pumped monolithic devices. Monolithic lasers do not lend themselves well to tunability. In order to tune, monolithic lasers need a change in the index of refraction. This is usually induced by the pump beam. The index changes are small, and consequently, the tuning range of a monolithic laser is limited to ~1 nm. A key parameter in determining the tuning range of the laser is the gain-to-loss ratio. Due to the large number of surfaces encountered in a discrete-element cavity, discrete-element lasers tend to have higher loss than monolithic lasers. Consequently, greater gain disposition is needed to extend the tuning range.

SUMMARY OF THE INVENTION

It is an object of the present invention to produce a diode-pumped Er:YAG laser that has an approximate tuning range of 6 nm.

It is another object of the invention to provide a laser the can easily access an atmospheric transmission window at 2.935 µm.

Another object of the invention is to provide a laser that is capable of producing average power of ~1 Watts at 2.9364 µm.

In order for the tuning potential of Er:YAG to be realized, a separate tuning element must be used. This necessitates the use of a discrete-element laser, of which the tuning element is a single part. The laser under consideration here uses side-pumping with a quasi-cw InGaAs laser diode array to generate the high gain required. The losses are minimized through steps such as placing Brewster's faces on the Er:YAG crystal, and using a low-loss etalon as a tuning element. Also, the cavity is configured such that the gain is well-coupled into the resonating transverse modes of the oscillator, thus enhancing the efficiency. The oscillator achieves a 6 nm tuning range, and 200 mW of average power when tuned to the atmospheric transmission window at 2.935 µm. Tuning of the laser to the atmospheric window at 2.935 µm has been demonstrated by propagating the laser output over a 0.5–1 km range. Tuning to and away from the atmospheric transmission window is readily achieved.

The invention is a discrete-element Er:YAG laser, side pumped by a 220 Watt peak-power InGaAs diode array. The tunable Er:YAG laser generates >500 mWatts at 2.94 µm, and is tunable over a 6 nm range near 2.936 µm. The oscillator is a plano-concave resonator consisting of a concave high reflector (5 cm or 10 cm radius of curvature), a flat output coupler (98% or 99% reflective), a 50%-doped Er:YAG crystal and a 0.3 mm thick YAG intracavity etalon, which serves as the tuning element. The cavity length is variable from 3 cm to 4 cm. The oscillator uses total internal reflection in the Er:YAG crystal to allow efficient coupling of the diode emission into the resonating modes of the oscillator. With the tuning element removed, the oscillator produces up to 1.3 Watts of average power at 2.94 µm. The duty factor of the laser is 6.5% and the repetition rate is variable up to 1 kHz.

This laser is useful for tuning to an atmospheric transmission window at 2.935 µm (air wavelength). The laser is also useful as a spectroscopic tool because it can access several infrared water vapor transitions, as well as transitions in organic compounds. Other uses for the invention include medical applications (e.g., for tissue ablation and with fiber optic laser scalpels) and as part of industrial effluent monitoring systems.

DETAILED DESCRIPTION OF THE INVENTION

The invention is a tunable diode-side-pumped Er:YAG laser that generates over 500 mW of average power at the 2.94 µm transition line. Prior to the development of the laser, diode-pumped Er:YAG lasers have been end-pumped monolithic devices that deliver ~200 mW of output at 2.94 µm. Much of the difficulty in obtaining higher average power from Er:YAG stems from the unfavorable lifetimes of the upper and lower laser levels, the complex state dynamics, and a low stimulated emission cross section ($\sigma \approx 3 \times 10^{-20} cm^2$). One of the most important dynamical processes in Er:YAG is cross relaxation between neighboring $Er^{3+}$ ions in the $^4I_{13/2}$ level. By recycling much of the $^4I_{13/2}$ population (lower laser level) into $^4I_{11/2}$, the cross relaxation overcomes the unfavorable lifetimes of the two levels, allowing the population inversion to be sustained. It is this cross relaxation along with thermalization of the two laser levels that allows cw oscillation on the 2.94 µm line to take place. This laser is a quasi-cw device that obtains higher average power and limited tunability as a result of side pumping with a quasi-cw InGaAs laser diode array. In this way, a higher gain-length product is generated, which is necessary for extending the tuning range of the laser, and for overcoming the higher losses associated with a discrete-element resonator.

Figure 1:
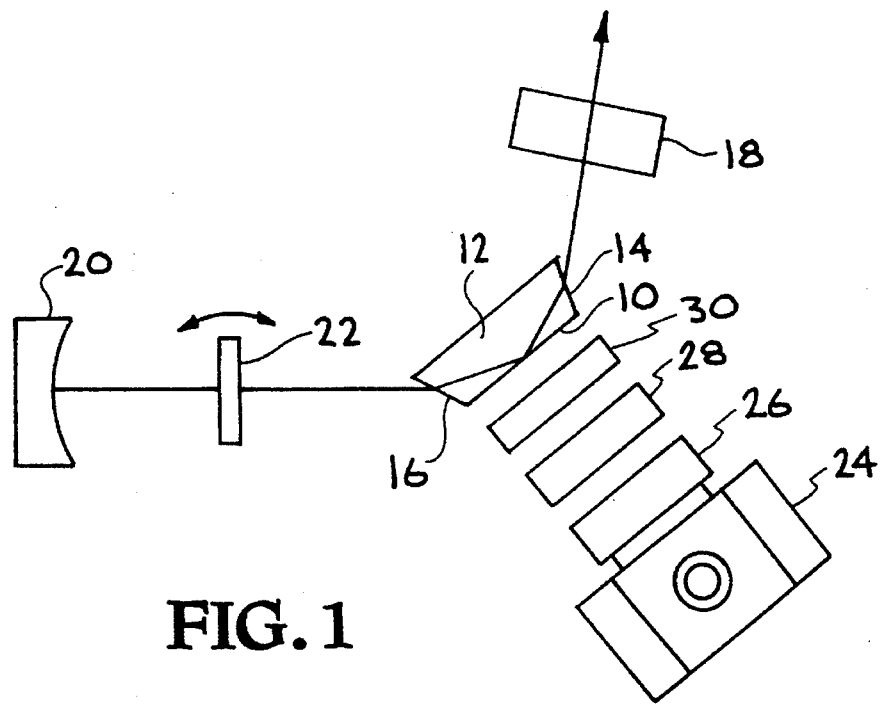
FIG. 1 shows a diode-pumped Er:YAG laser side pumped with a 4 bar InGaAs diode array.

The Er:YAG oscillator, shown in FIG. 1, is an angled resonator, in which the circulating 3-µm beam undergoes total internal reflection (TIR) off a polished side face 10 of the Er:YAG crystal 12. The advantage of the TIR resonator is that it is a side-pumped geometry that allows the gain to be well coupled into the resonating modes. This, in turn, leads to higher optical efficiencies comparable to those of end-pumped lasers. Since the cross relaxation rate increases with $Er^{3+}$ concentration, a further efficiency enhancing measure is to use more heavily doped Er:YAG material. Due to availability, the most heavily doped crystal used in our laser is 50% Er:YAG. The crystal has nominal dimensions of 2 mm×2 mm×14 mm. The end faces 14 and 16 are oriented at Brewster's angle, and the TIR glancing angle is fixed at 8° with respect to polished side face 10. Apart from these features, the laser cavity is a 4 cm long plano-concave resonator with a flat 98.0% reflective output coupler 18 ($CaF_2$ substrate), and a 5 cm radius-of-curvature high reflector 20. The tuning element is a 0.3 mm uncoated YAG etalon 22, where YAG is chosen because of its high transmission at 3 µm and its availability. The laser tunes as the etalon 22 is tilted. A quasi-cw, 4 bar InGaAs laser diode array 24, emitting at 965 nm, pumps the oscillator through the side face 10 of the crystal 12. Each diode bar in the array has a length of 1 cm, and a peak power of 70 Watts. The bars are bonded to separate microchannel cooling packages, which upon stacking to form the array, result in a diode bar spacing of 1 mm. Three cylindrical lens elements 26, 28 and 30 couple the diode emission into the Er:YAG crystal. The first is a cylindrical microlens 26 fastened directly to each diode bar package. The microlens captures the fast axis of the diode bar, reducing the full angle divergence from 60° to 10 mrad. The remaining two elements are macroscopic cylindrical lenses 28 and 30 with focal lengths of 25 mm and 6 mm respectively. The 25 mm lens focuses the slow axis from each diode bar, while the 6 mm lens collapses the four near-collimated fast-axis outputs from the array to a single stripe at the crystal. The size of the stripe is 200 µm ×5 mm, resulting in a pump irradiance of 20 $kW/cm^2$.

Figure 2:
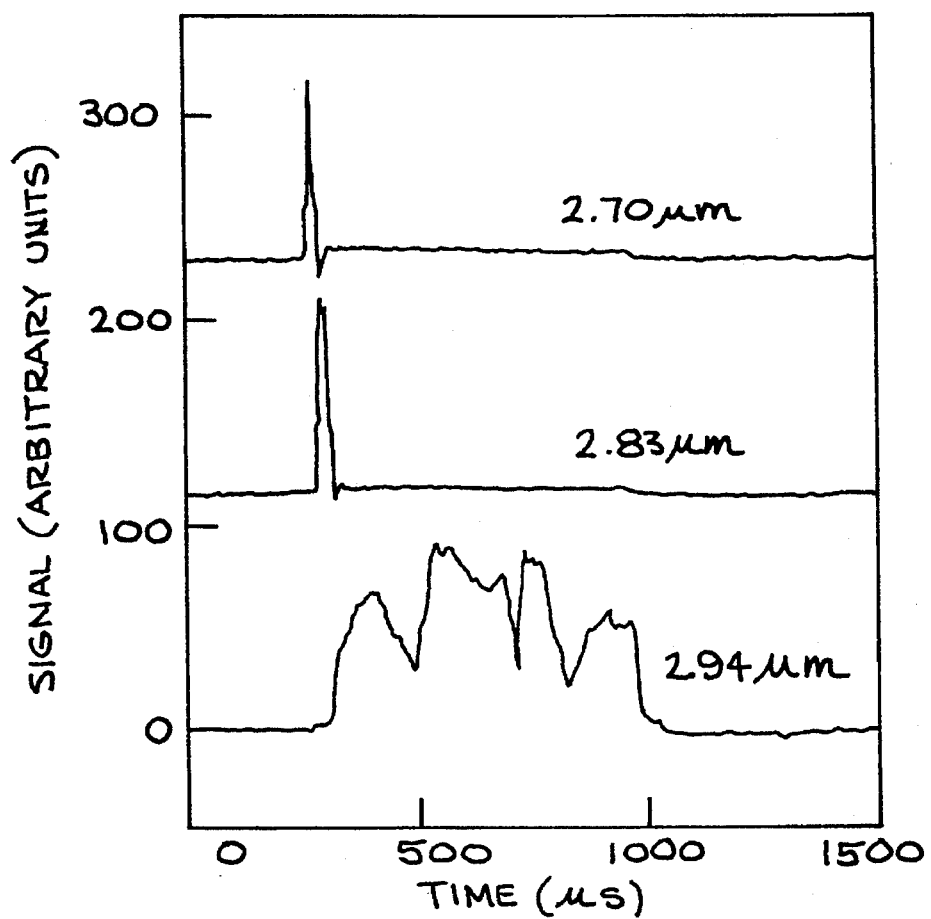
FIG. 2 shows the temporal dependence of several emission lines from an Er:YAG laser.

Typically, the laser is operated at a repetition rate of 100 Hz and a pulse duration of 400 µs. Under these conditions, the laser, without the etalon, produces 710 mWatt at 2.94 µm. The optical-to-optical and the slope efficiencies are 8% and 13%, respectively. With the cavity mirrors removed, the gain-length produce, $g_o l$, is measured to be 0.05±0.02 at the end of the 400 µm pump pulse. On the basis of measured threshold pump powers using 98% reflective and 99% reflective output couplers, the internal loss of the resonator is estimated to be 2±1% per round trip. Even though the dominant emission line is at 2.94 µm, emission occurs at 2.83 µm and 2.70 µm as well. In keeping with notation found in the literature, the 2.70, 2.83 and 2.94 µm transitions correspond to the 1→1, 6→7 and 2→7 Stark transitions of the $^4I_{11/2}$–$^4I_{13/2}$ system, respectively. Here, the numbers label the Stark levels in the respective $^4I_J$ manifolds, 1 being the lowest level in a particular manifold. FIG. 2 shows the temporal dependencies of the three emission lines when the laser is pumped for 700 µs. The three lines emit sequentially in the order 2.70 µm, 2.83 µm and 2.94 µm, with the first two lines quenching within 40 µs of the diode pulse leading edge. Such time dependent emission at several wavelengths has been observed before in lamp-pumped Er:YAG lasers. The trend is always toward the red with increasing time. This is primarily because the levels involved with the red shifted lines are those with the most favorable Boltzmann factors for sustaining a population inversion.

Figure 3:
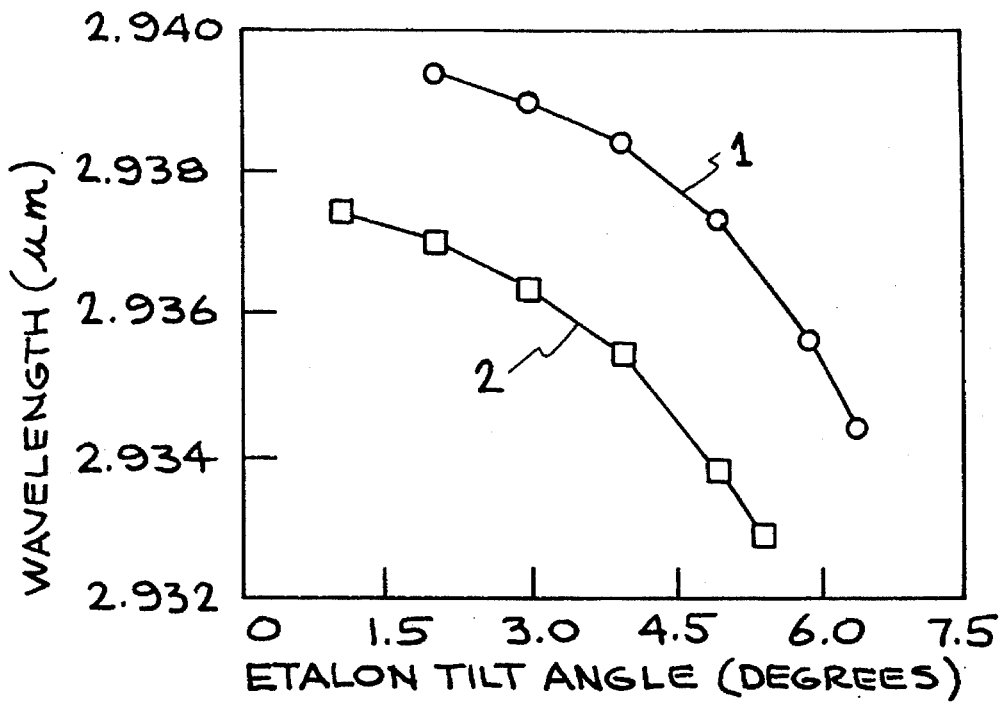
FIG. 3 shows intracavity etalon tuning curves for an Er:YAG laser using two different etalons.
Figure 4:
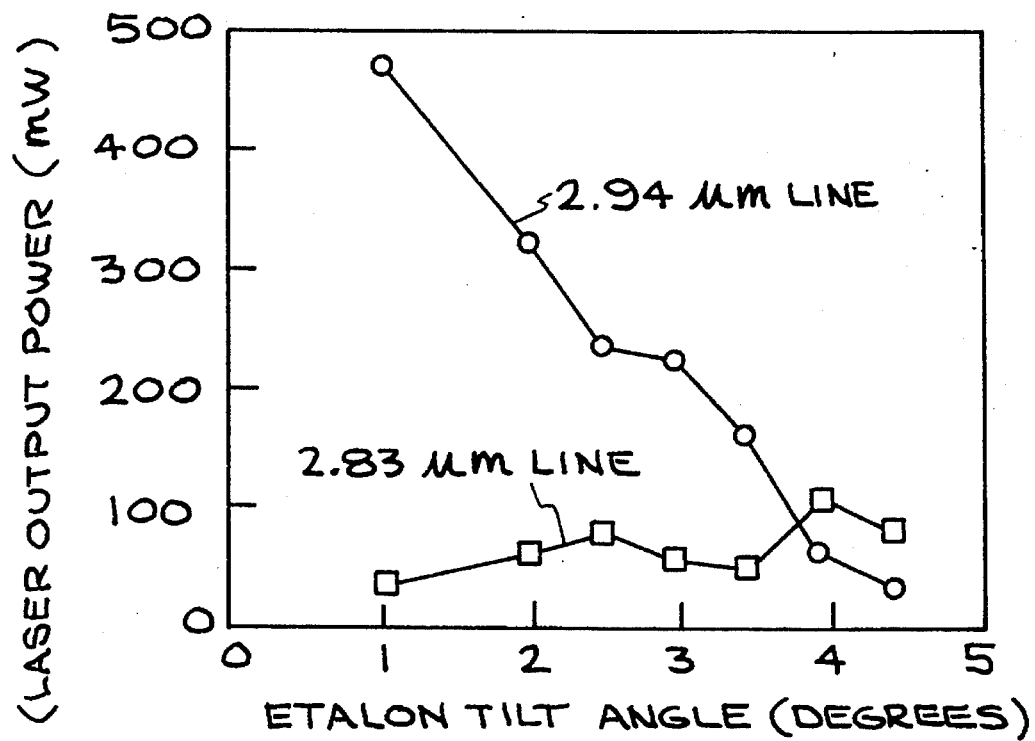
FIG. 4 shows the output power dependence on etalon tilt angle for laser emission at 2.94 µm and 2.83 µm.

The 2.94 µm emission line is 8 nm wide (FWHM), and thus affords limited tunability. The line center is at 2.936 µm. FIG. 3 gives tuning curves for two 0.3 mm etalons. This etalon thickness is chosen to give a free spectral range comparable to the width of the transition. Consequently, the laser tunes without the complication of an etalon mode hop. The difference between the tuning curves is due to the thickness error ($\delta 1 \sim 0.5$ µm) in the etalons. Thus, while a single etalon gives a nominal tuning range of 5 nm, both etalons allow a full wavelength coverage of 6 nm. The output power varies from 30 mW to 580 mW, the output power being dependent on the frequency shift from gain peak and on the etalon tilt angle. FIG. 4 shows the dependence of the 2.94 µm power on the etalon tilt angle when etalon 2 is in the cavity. Since the laser output always has a 2.83 µm component, the 2.83 µm power dependence is shown as well. As the laser is tuned farther off the gain peak at 2.936 µm, laser emission at 2.83 µm becomes dominant. This is likely a result of hindered depletion of the sixth Stark level in the $^4I_{11/2}$ manifold as the 2.94 µm emission is suppressed.

Thermal lensing in the YAG rod, by causing the resonator to become unstable, limits the duty factor of the laser to 4%. With the plano-concave cavity, the resonator becomes unstable when the focal length of the thermal lens is less than the distance between the concave high reflector and the thermal lens (center of the crystal). The focal length at which the resonator becomes unstable is 25 mm. Given that heat is removed on the three non-optical side faces of the crystal, the thermal load corresponding to this focal length is 8 Watts. The duty factor is easily increased by moving the high reflector closer to the crystal. With the distance from the high reflector to the thermal lens at 18 mm, the duty factor is 6%. As an alternate method for enhancing the duty factor, the Er:YAG crystal is replaced with an AR-coated 50% Er:YAG crystal with dimensions of 1 mm×2 mm×14 mm. The crystal thickness is now 1 mm. With this crystal and the distance of the high reflector to the thermal lens now at 13 mm, the laser generates 1.3 W at 2.94 µm at a duty factor of 11%.

The resonator in this invention uses total internal reflection (TIR) inside the Er:YAG crystal to allow efficient coupling of the diode array emission into the resonating transverse modes of the oscillator. In the region where the total internal reflection takes place, the emission from the laser diode array is collapsed to a stripe with a width of 200 µm. The length of this stripe is approximately 5 mm. The resonating modes of the oscillator have a glancing angle of incidence (8°) on the TIR face of the Er:YAG crystal. This particular configuration is chosen to give a high gain-length product, $g_o l$, as is necessary for extending the tuning range of the laser. A laser diode array, consisting of four bars is used as a pump source. Each diode bar is fitted with a microlens for collimating the bar output. A pair of macroscopic cylindrical lenses (25 mm f.l. and 6 mm f.l.) collapse the diode emission to form the pump stripe at the Er:YAG crystal. This technique can be extended to larger diode arrays if so desired.

The cavity is designed to be a low-loss, discrete-element cavity. The following steps are taken to reduce the loss inside the cavity. First, the end faces of the Er:YAG crystal are configured with Brewster's angle faces. This forces the laser output to be polarized; however, as a consequence of the polarization, the theoretical loss at each Brewster's face is zero. The Brewster's angle faces and the total internal reflection led to the trapezoidal shape of the Er:YAG crystal. The Brewster's angle, the TIR glancing angle, and the width of the clear aperture through the crystal (1 mm) fix the crystal dimensions. The crystal is 2 mm deep. The longest side face (frosted) is 14.0 mm long, and the shortest side face (polished TIR face) is 12.6 mm long. A second step involves using an intracavity etalon as the tuning element. The reasons for using an etalon are: (1) it is a low loss element, (2) it is very compact, and (3) it allows tuning over the width of the 2.94 μm with a course angular adjustment. Other tuning elements considered, for example gratings and birefringent filters, do not meet these properties. The etalon material that is used is YAG because of (1) its high transmission at 2.94 μm, (2) its availability, and (3) its moderate index of refraction (n=1.8).

The cavity length is kept short (≦4 cm), and the Er:YAG crystal thickness is kept low (1–2 mm). The narrow thickness of the crystal minimizes thermal lensing in the crystal, and the short cavity maintains cavity stability in the presence of a short focal length thermal lens (18–25 mm focal length). These two factors combined serve to enhance the duty factor of the laser. The laser has been operated to a maximum duty factor of 11%. Consequently, with the tuning element removed, the oscillator has generated 1.3 Watts of output at 2.94 μm, which is a six-fold increase in power level over previous diode-pumped Er:YAG oscillators (e.g., 200 mW monolithic lasers).

Changes and modifications in the specifically described embodiments can be carried out without departing from the scope of the invention, which is intended to be limited by the scope of the appended claims.

We claim:

1. A tunable Er:YAG laser, comprising:
  an Er:YAG gain medium;
  a diode array optically aligned to side pump said gain medium;
  an optical cavity comprising a high reflector and an output coupler, wherein said Er:YAG gain medium is placed within said optical cavity, wherein laser light propagating on said optical cavity undergoes total internal reflection on an internal portion of said Er:YAG gain medium, wherein pump light from said diode array is directed onto an outer portion of said Er:YAG gain medium, wherein said outer portion is adjacent to said internal portion to allow efficient coupling of the pump light from said diode array into said optical cavity; and
  a tuning etalon positioned within said optical cavity.

2. The laser of claim 1, wherein said Er:YAG gain medium comprises a 50% Er:YAG doped crystal.

3. The laser of claim 2, wherein said etalon comprises a 0.3 mm uncoated YAG etalon.

4. The laser of claim 3, wherein said diode array comprises an InGaAs laser diode array.

5. The laser of claim 4, wherein said diode array comprises a 4 bar array.

6. The laser of claim 5, wherein said optical cavity comprises a plano-concave resonator.

7. The laser of claim 6, wherein said high reflector comprises a 5 cm radius-of-curvature high reflector.

8. The laser of claim 7, wherein said output coupler has 98.0% reflectance at 2.94 μm.

9. The laser of claim 8, further comprising coupling optics located between said diode array and said gain medium.

10. The laser of claim 9, wherein said gain medium comprises two end faces aligned to said optical cavity, each face of said two end faces oriented at Brewster's angle with respect to said optical cavity, wherein a side of said gain medium facing said diode array comprises a polished face, wherein a beam generated within said optical cavity undergoes total internal reflection (TIR) from a surface inside said gain medium at said polished face.

11. The laser of claim 10, wherein said gain medium has dimensions selected from a group consisting of 2 mm×2 mm×14 mm and 1 mm×2 mm×14 mm.

12. The laser of claim 11, wherein said gain medium is optically aligned with said optical cavity such that the TIR glancing angle is 8°.

13. The laser of claim 12, wherein said output coupler comprises $CaF_2$.

14. The laser of claim 13, wherein said optical cavity has a 4 cm length.

15. The laser of claim 14, wherein said diode array emits light at a wavelength of 965 nm.

16. The laser of claim 15, wherein each diode bar in said array has a length of 1 cm and produces a peak power of 70 watts.

17. The laser of claim 16, wherein each said diode bar is bonded to a separate microchannel cooling package.

18. The laser of claim 17, wherein each said diode bar is separated from an adjacent diode bar by 1 mm.

19. The laser of claim 18, wherein said coupling optics comprise three cylindrical lenses,
  wherein a first lens of said three cylindrical lenses comprises a microlens fixedly attached to each said microchannel cooling package, wherein said first lens captures the fast axis of each said diode for reducing the full divergence from 60° to 10 mrad,
  wherein a second lens of said 3 cylindrical lenses comprises a 25 mm focal length macroscopic lens,
  wherein a third lens of said 3 cylindrical lenses comprises a 6 mm focal length macroscopic lens,
  wherein said second lens focuses the slow axis from each said diode bar,
  wherein said third lens focuses the output from said second lens to a single stripe at the crystal.

20. The laser of claim 17, wherein said stripe has dimensions of 200 μm×5 mm.

* * * * *